United States Patent [19]

Kunze et al.

[11] 4,075,309

[45] Feb. 21, 1978

[54] PROCESS FOR THE PRODUCTION OF HIGHLY CONCENTRATED MAGNESIUM CHLORIDE SOLUTIONS

[75] Inventors: Dietmar Kunze; Siegfried Kirchner, both of Bad Salzdetfurth, Germany

[73] Assignee: Kali und Salz Aktiengesellschaft, Germany

[21] Appl. No.: 782,388

[22] Filed: Mar. 29, 1977

[30] Foreign Application Priority Data

Mar. 29, 1976  Germany .............................. 2613289

[51] Int. Cl.$^2$ .......................... C01F 5/30; C01F 5/00; C01D 3/06; C01F 5/40

[52] U.S. Cl. .................................. 423/497; 423/499; 423/554

[58] Field of Search ......................... 423/497, 499, 554

[56] References Cited

U.S. PATENT DOCUMENTS

| | | | |
|---|---|---|---|
| 1,012,387 | 12/1911 | Malcolm et al. ................. | 423/497 X |
| 2,479,001 | 8/1949 | Burke et al. ..................... | 423/497 X |
| 3,729,550 | 4/1973 | Boyum et al. .................... | 423/497 |

FOREIGN PATENT DOCUMENTS

| | | | |
|---|---|---|---|
| 2,064,502 | 5/1973 | Germany .............................. | 423/499 |

*Primary Examiner*—Edward Stern
*Attorney, Agent, or Firm*—Anthony J. DeLaurentis

[57] ABSTRACT

Concentrated magnesium chloride solutions are prepared from industrial liquors or brines by evaporating the liquor in a vacuum in two or more stages in a counter current evaporator with crystallization characteristics up to a final concentration of 440 to 475 g/l $MgCl_2$, a solid content of 12 to 25% by weight and a final temperature of 95° to 105° C, whereafter the liquor is separated from crude crystallized carnallite and sodium chloride, is debrominated by the addition of chlorine, is neutralized by the addition of lime or dolomite milk, is separated in the heat from solid substances, is cooled to effect further crystallization, and is finally separated as a concentrated magnesium chloride solution containing 400 to 465 g/l $MgCl_2$.

14 Claims, No Drawings

PROCESS FOR THE PRODUCTION OF HIGHLY CONCENTRATED MAGNESIUM CHLORIDE SOLUTIONS

For the production of metallic magnesium and other magnesium-containing products in large scale industrial processes, magnesium chloride solutions with as high as possible a content of $MgCl_2$ and as low as feasible content of any foreign and accompanying substances are used as a starting material. However, the magnesium chloride solutions obtained by the processing of crude potassium salts such as carnallite-containing crude potassium salts are just as unsuitable for this purpose as are magnesium chloride solutions which are obtained by the process of natural brines or artificial salt solutions obtained, for example, by leaching out potassium salt deposits, since magnesium chloride solutions obtained by the above processing techniques usually contain a magnesium chloride content of less than 320 g/l. In addition, such solutions also contain in substantial amounts alkali chloride and bromide, as well as magnesiun sulfate, and in smaller quantities heavy metals and organic substances. Moreover, when such solutions are evaporated to increase the magnesium chloride content to as high a level as possible, the previously mentioned salts are separated as a mixture of potassium and sodium chloride, carnallite and sulfatic potassium magnesium salts, which mixture can be processed only with great difficulty.

In the German Pat. No. 676,406 it is stated in this regard as having been previously known that the magnesium chloride solutions obtained during the processing of carnallitic crude potassium salts are evaporated in a multistage evaporator up to the beginning of separation of carnallite and that they are separated from the mixture consisting of sodium chloride and native magnesium sulfate in the heat from the mixture crystallized thereby. During the subsequent cooling to room temperature, artificial carnallite crystallizes out of the solution which is separated from the final liquor. These final liquors always contain about 1% by weight of potassium and/or sodium chloride and considerable quantities of magnesium sulfate. The sulfate ions contained in the final liquor are then precipitated with milk of lime while the alkali chlorides during the evaporation of the magnesium chloride solution are separated by precooling and clearing up of the solution at a temperature of about 130° C. According to statements in the above mentioned patent, the liquor remaining after separation of the sodium chloride and native magnesium sulfate is then evaporated without intermediate cooling at temperatures rising gradually to above 115° C. At the same time artificial carnallite and almost the entire content magnesium sulfate is separated. The salt mixture is isolated from the solution. In the case of a subsequent cooling of the solution, a mixture consisting of carnallite and sodium chloride crystallizes out and is likewise separated from the solution. The remaining magnesium chloride solution is saturated with carnallite as well as with magnesium chloride, and may be used as a commercial product or it may be used for the production of solid magnesium chloride. However, this magnesium chloride is not usable for the main area of application, namely as a starting material for a smelting flux electrolysis because of its sulfate content. The sulfate content in the case of this known method of operation may be precipitated and separated during evaporation of the liquor through the addition of suitable precipitants, but there is also the possibility of removing the sulfate from the sulfate-containing magnesium chloride by recrystallizing the latter several times.

A further possibility is proposed in the German Pat. No. 1,667,826. According to this patent, the sulfate-containing magnesium chloride solutions are to be evaporated under a vacuum up to a temperarture of 60°-90° C, and are to be heated at atmospheric pressure or slightly in excess of atmospheric pressure for up to 5 hours at temperatures between 108° and 130° C, whereupon the developing precipitate is separated at the same temperature.

Whenever liquors from the carnallite processing are used for this process, the filtrate is cooled subsequently to a temperature of about 25° C and is separated from the precipitate. The filtrate of the high temperature separation, or the filtrate obtained after cooling, is finally evaporated at temperatures of 60°-90° C up to a content of 50% by weight of magnesium chloride hexahydrate and is subsequently cooled. The bischofite obtained hereby is isolated as a product.

The remaining sulfate ions, as well as heavy metal and bromide ions, may be precipitated and separated from pre-purified industrial magnesium chloride solutions according to the disclosure of the German Pat. AS No. 2,118,623 by the addition of calcium and sulfide ions at temperatures of 50°-80° C and a pH value of 4-8. The remaining solution is subsequently treated with chlorine. As a result of this procedure the bromide ions are oxidized to free bromine and the sulfide ions to sulfate ions. After the bromine has been driven out of the solution, the sulfate ions are precipitated by the addition of barium ions and then separated from the magnesium chloride solution which is practically free of sulfate.

The processes known from the status of the prior art essentially start out from the fact, that the debrominating of the liquor caused by the chlorine may be executed only whenever the magnesium chloride liquor has been largely freed of the chloridic and sulfatic salts as well as of the heavy metal ions. Experiments of debrominating the industrial magnesium chloride solution evaporated up to a final concentration of 415 – 475 g/l of $MgCl_2$ directly in the heat under the influence of chlorine, always lead to strong salt deposits in the debrominating installation, which makes further operation impossible. In order to bring about the already very far reaching purification of the magnesium chloride liquors for the purpose of a continuous operation of the debrominating installation, it is necessary in the case of the previously known processes to cool the liquor or the turbid liquid, at least after the first evaporation, down to room temperature, to separate the solid substances, and to again heat it up subsequently for the debrominating. In the case of a differentiated cleaning of the liquor, a repeated cooling and reheating of the liquor may be necessary according to the known processes.

Therefore, there is a need for techniques of avoiding the occurrence of incrustations during the debrominating of already largely concentrated magnesium chloride solutions contaminated with sulfates, chlorides or bromides and other accompanying substances just as a repeated cooling and reheating of the lyes. Furthermore, there is a need for techniques of separating the sulfates amd other secondary components of these liquors without using for this purpose considerable quantities of precipitants.

With the foregoing in mind, a process has been found for the production of highly concentrated magnesium chloride solutions from industrial liquors or brines which, beside having a $MgCl_2$ content of less than 320 g/l contains alkali chlorides, bromides, sulfates and other impurities. The process involves treating the starting liquors or brines by evaporation, debrominating by means of chlorine in the heat, neutralization, cooling and separation of crystallizates and impurities. According to the present process, the liquor is evaporated under a vacuum in two or more stages in a counter current evaporator with crystallization characteristics up to a final concentration of 440 – 475 g/l of $MgCl_2$, a content of solid substance of 12 to 25% by weight and final temperatures of 95° to 105° C. The resulting liquor is separated from crude crystallized carnallite and sodium chloride while the magnesium sulfates obtained in the finest form and other impurities are removed with the separated liquor. The liquor is then subjected to debromination and oxidation by means of chlorine in the heat and neutralization with lime or dolomite milk hot from the solid substances and is cooled subsequently while crystallizing to a temperature of 25° C, and is then separated from the developed crystallizate of carnallite and sodium chloride as a concentrated magnesium chloride solution with 400 to 465 g/l of $MgCl_2$.

In order to carry out the process of the invention, magnesium chloride solutions can be used which are obtained during the potassium salt processing. But all other magnesium chloride solutions which contain equal or similar secondary substances as those obtained in case of the potassium salt processing, may be processed according to the process of the invention. To these belong, among others, magnesium chloride solutions which are obtained during the processing of natural brines, of sea water or of salt solutions which are obtained by leaching salt deposits.

These brines are first evaporated in two or more stages or steps in the counter current and under a vacuum to a liquor with a solid substance content of 12 to 25% by weight and a concentration of 440 – 475 g/l of $MgCl_2$. The final temperature in that case is from about 95 to about 105° C whenever a vacuum of 180 to 240 torr is maintained in the final step. Operation under these conditions and of the corresponding control of the evaporation, will ensure that the carnallite and sodium chloride solids are obtained in the form of rough crystals, while the magnesium sulfates and other impurities are present in the most finely dispersed form. Advantageously this evaporation is carried out in evaporators with crystallization characteristics in which a larger quantity of crystallization mixture is circulated in a ratio to the quantity of liquor fed per unit of time and in which only slight temperature differences exist.

The optimum values for the process of the invention depend on the composition of the magnesium chloride liquor to be processed and may be determined in each case easily by simple preliminary experiments.

In order to prevent in the case of this evaporation process the formation of sulfatic double salts, such as kainite and langbeinite, and to further the formation of more easily soluble magnesium sulfates, such as preferably $MgSO_4.H_2O$ and $MgSO_4.5/4H_2O$, it will be advantageous to adjust the content of the starting solution of potassium chloride and of magnesium sulfate in such a way, that after evaporation less than 80 g/l, preferably less than 45 – 50 g/l of potassium chloride and magnesium sulfate are present in the liquor. If need be, these values can be corrected by preceding measures, such as, for example, partial desulfation or cold decomposition of carnallite.

After the initial evaporation, the lye is separated from the rough crystals of the carnallite and the sodium chloride in such a way that it still contains the magnesium sulfates and impurities present in a most finely dispersed form. For this purpose, one may use, for example, a hydrocyclone or a filtering arrangement with correspondingly permeable filter material. In the hydrocyclone and in the case of the proper adjustment, the rough crystalline portions of the solid substance content of liquor are separated while the finely dispersed portions are removed with the liquor. The same separating effect may be achieved by a selection of a filtering material of corresponding permeability in the filtering arrnangements. With these measures, one will obtain a carnallite poor in admixed sulfates with a lesser or larger quantity of sodium chloride which may be further processed.

In order to obtain a carnallite largely also freed of sodium chloride, the starting brine may at first be evaporated only to a concentration of 330–370 g/l of $MgCl_2$ in the manner provided, and the sodium chloride crystallizing thereby may be separated from the liquor. The remaining liquor is then further evaporated up to a final temperature of 95° – 105° C and a final concentration in the liquor of 440 to 475 g/l of $MgCl_2$ under the vacuum and is then separated from the roughly crystalline carnallite poor in sodium chloride which is excellently suited for further processing.

The liquor obtained from this step in the process, which still contains magnesium sulfate and solid impurities as a solid substance portion may then be fed without trouble to the debrominating installation, wherein bromination will be achieved in a manner known per se by the action of chlorine in the heat. In this case, the oxidizable impurities are also destroyed oxidatively beside the bromide ions or are transferred to higher oxidation states. The solid substances obtained in the liquor in the case of this debrominating do not present any problems, and no incrustations whatever occur in the apparatus in which this debrominating is accomplished.

Whenever a very strong decrease of the sulfate content in the end product is striven for, the liquor separated from the roughly crystalline precipitate of the carnallite and of the sodium chloride can at first be concentrated and freed of solid substances before it is fed to the debrominating. In the case of this concentration a temperature of 85° – 130° C may be maintained in the liquor. The solid substances separated from the liquor after the concentration consist essentially of easily soluble magnesium sulfates which may be processed into fertilizers or other second products.

The reaction solution drawn off from the debrominating step is then neutralized with lime or dolomite milk up to a pH value of the reaction solution of from 3 to 6, this pH value being measured in the undiluted reaction solution. With this measure, the heavy metal ions are precipitated out as difficulty soluble precipitates and may be separated from the solution together with the solid impurities and magnesium and calcium still possibly contained in the reaction solution. This separation is accomplished in the heat.

Subsequently, the solution, freed of these solid substances, is cooled to room temperature and is separated from the crystallizate separating thereby, which crystallizate consists essentially of carnallite and sodium chloride. In that case a magnesium chloride solution is obtained which contains 400 to 465 g/l of $MgCl_2$, 10 to 25 g/l of $MgSO_4$, 1 to 3 g/l of KCl and 2 to 5 g/l of NaCl, as well as bromide and heavy metal ions in trace quantities.

The combination of steps in the process according to the invention is simplified as compared to the status of the prior art for the production of highly concentrated magnesium chloride solutions which have a low magnesium sulfate content and only very slight quantities of potassium, sodium chloride, bromides and of heavy metals. An essential advantage of this process is the avoidance of intermediate coolings and reheatings of the solutions of liquors that are to be treated. In addition, the process of the invention offers the advantageous possibility of removing most of the sulfate contained in the starting liquors from the brines and the final products, without using any precipitants for such removal. As by-products of the process of the invention, there may be obtained carnallite poor in sulfate and possibly also poor in sodium chloride, and magnesium sulfates with low potassium chloride contents. There by-products may be processed further without any technical difficulties into valuable products. As compared to the known processed where the debrominating of the evaporated liquors may be carried out only after removal of all portions of solid substances, the process according to the invention results in a bromine yield improved by up to 2%.

EXAMPLE 1

50 $m^3$ $MgCl_2$ liquor from the carnallite decomposition which contains 310 g/l $MgCl_2$, 45 g/l $MgSO_4$, 45 g/l KCl, 35 g/l MaCl, 3.2 g/l bromide and 865 g/l $H_2O$, are evaporated in a two-stage counter current evaporator installation with a forced circulation of 4,000 $m^3$/h/stage at a final temperature of 100° C and in a vacuum of 210 mm Hg up to the $MgCl_2$ final concentration of 465 g/l. At the same time, 16.3 $m^3$ water is removed from the liquor and a content of 23.5% of solid substance occurs in the 48.7 t of cloudy liquor.

19.5% of solid substance with a grain size > 0.15 mm is separated from this cloudy liquor by means of a hydrocyclone and adhering liquor of the carnallite decomposition is fed in after dehydration up to 5by weight.

The cloudy liquor which still contains 4% by weight of solid substance is debrominated by the addition of 93 kg of chlorine and 1500 kg of steam, is neutralized by means of 20 kg of CaO and is purified at a temperature of 122° C of solid substances ($MgSO_4 \cdot H_2O$; $MgSO_4 \cdot 5/4\ H_2O$, $CaSO_4/CaSO_4 \cdot 1/2\ H_2O$, clay, heavy metal hydroxides).

The purified solution is cooled in a three-step crystallization with forced circulation to a temperature of 25° C, whereby beside 1.7 t of carnallite and sodium chloride, one will additionally obtain 28.7 $m^3$ of pure magnesium chloride solution with 440 g/l $MgCl_2$, 18 g/l $MgSO_4$, 2 g/l KCl, 5 g/l NaCl, 0.1 g/l bromide, 865 g/l $H_2O$ and traces of ions of heavy metal, which are separated from the solid substances. The solids which consist of carnallite and sodium chloride are fed to the carnallite decomposition after dehydration to 7% by weight of adhering liquor.

EXAMPLE 2

The procedure of Example 1 was followed except that the evaporation is interrupted after the first stage at 350 g/l $MgCl_2$ and beside carnallite, 0.7 t of 92% sodium chloride are separated from the liquor. The remaining liquor is further processed according to Example 1. 8.2 t of carnallite obtained in the lower course of the hydrocyclone are contaminated only with 10% by weight of sodium chloride.

EXAMPLE 3

38.2 t of cloudy liquor with 4% by weight of solid substance obtained according to Example 1 in the hydrocyclone upper course are concentrated in a hot clarifier to 38% by weight of solid substance at a temperature of 105° C. The concentrated cloudy liquor is dehydrated to 30% by weight of liquor moisture and is used further as an easily soluble $MgSO_4 \cdot H_2O/MgSO_4 \cdot 5/4\ H_2O$ containing little potassium and sodium chloride, while 26.3 $m^3$ of hot clarifier overflow free of solid substance is fed to the debromination according to Example 1 and processed further.

EXAMPLE 4

The hot clarifier overflow free of solid substance obtained according to Example 3 is cooled to a temperature of 25° C while crystallizing from a temperature of 105° C prior to debromination. 3.4 t of technically pure synthetic carnallite containing little sulfate and 0.3 t of sodium chloride are separated from the solution and after dehydration to 7% by weight of adhering liquor, are fed to the carnallite decomposition. After heating, the solution is debrominated and neutralized and after cooling is undersaturated in potassium and sodium chloride. The solution contains 435 g/l $MgCl_2$, 17 g/l $MgSO_4$, 1.5 g/l KCl, 4.5 g/l NaCl, 0.1 g/l bromide and neavy metal in traces.

What is claimed is:

1. In a process for the production of highly concentrated magnesium chloride solutions from industrial liquors or brines which contain less than 320 g/l $MgCl_2$, and which contain significant amounts of alkali chlorides, bromides, sulfates and other impurities, wherein the production steps include evaporation to form a hot liquor which contains crystallized carnallite and sodium chloride, separation of the crystallized carnallite and sodium chloride from the hot liquor, debromination of the resultant hot liquor by means of chlorine, neutralization, cooling and separation of crystallizates and impurities, the improvement which comprises:
   a. evaporating an industrial liquor or brine in two or more stages under a vacuum and in a counter current evaporator with crystallization characteristics up to a final concentration of 440 to 475 g/l $MgCl_2$, a solid substance content of 12 to 25% by weight and final temperatures of 95° to 105° C;
   b. separating the resulting hot liquor, together with magnesium sulfates and other impurities which are contained therein, from the crude crystallized carnallite and sodium chloride, said resulting hot liquor containing magnesium sulfate and other impurities in a finely dispersed form which renders them easily separable from the crude crystallized carnallite and sodium chloride;
   c. debrominating said resulting hot liquor by oxidation by the addition of chlorine;
   d. neutralizing the debrominated liquor while in the hot state with lime or dolomite milk;
   e. removing from the hot neutralized liquor any solid substances formed during said neutralizing step;

f. cooling the hot neutralized liquor to room temperature while crystallizing additional carnallite and sodium chloride; and g. separating the crystallized carnallite and sodium chloride from a concentrated magnesium chloride product solution containing 400 to 465 g/l of $MgCl_2$.

2. The process of claim 1, wherein the liquor or brine starting material is first evaporated to a concentration of 350 g/l $MgCl_2$ and the sodium chloride obtained thereby is separated, whereupon the remaining liquor is evaporated up to a final temperature of 95° to 105° C and a final concentration of 440 to 475 g/l $MgCl_2$.

3. The process of claim 1, wherein the liquor or brine starting material contains potassium chloride and magnesium sulfate as impurities, and wherein the liquor obtained from the evaporation step contains less than 80 g/l of potassium chloride.

4. The process of claim 2, wherein the liquor or brine starting material contains potassium chloride and magnesium sulfate as impurities, and wherein the liquor obtained from the evaporation step contains less than 80 g/l of potassium chloride.

5. The process of claim 1, wherein the liquor separated from the crude crystallized carnallite and sodium chloride is concentrated and is separated from any solid substances formed during the concentration step before being debrominated.

6. The process of claim 2, wherein the liquor separated from the crude crystallized carnallite and sodium chloride is concentrated and is separated from any solid substances formed during the concentration step before being debrominated.

7. The process of claim 3, wherein the liquor separated from the crude crystallized carnallite and sodium chloride is concentrated and is separated from any solid substances formed during the concentration step before being debrominated.

8. The process of claim 5, wherein the liquor is concentrated at temperatures of 85° to 130° C.

9. The process of claim 6, wherein the liquor is concentrated at temperatures of 85° to 130° C.

10. The process of claim 7, wherein the liquor is concentrated at temperatures of 85° to 130° C.

11. The process of claim 5, wherein the liquor is separated from the crude crystallized carnallite and sodium chloride is cooled while crystallizing, is separated from the resulting crystallizate and is subsequently subjected to the debromination step.

12. The process of claim 6, wherein the liquor is separated from the crude crystallized carnallite and sodium chloride is cooled while crystallizing, is separated from the resulting crystallizate and is subsequently subjected to the debromination step.

13. The process of claim 7, wherein the liquor is separated from the crude crystallized carnallite and sodium chloride is cooled while crystallizing, is separated from the resulting crystallizate and is subsequently subjected to the debromination step.

14. The process of claim 8, wherein the liquor is separated from the crude crystallized carnallite and sodium chloride is cooled while crystallizing, is separated from the resulting crystallizate and is subsequently subjected to the debromination step.

* * * * *